United States Patent [19]
Kinder et al.

[11] 3,898,002
[45] Aug. 5, 1975

[54] METHOD AND APPARATUS FOR EDITING A FILM STRIP

[75] Inventors: Claude E. Kinder, Charlotte, N.C.; Robert L. Jones, Jr.; Walter W. Marsh, both of Richmond, Va.

[73] Assignee: Kinderfoto International, Inc., Charlotte, N.C.

[22] Filed: Aug. 1, 1973

[21] Appl. No.: 384,617

[52] U.S. Cl. .................. 355/40; 355/112; 355/41
[51] Int. Cl. ............................................ G03b 27/52
[58] Field of Search ............... 355/40, 41, 42, 112

[56] References Cited
UNITED STATES PATENTS

| | | | |
|---|---|---|---|
| 2,911,884 | 11/1959 | Caudle | 353/27 |
| 3,156,172 | 11/1964 | Baasner | 355/112 X |
| 3,516,741 | 6/1970 | Thaddey | 355/41 X |
| 3,580,666 | 5/1971 | Vance | 355/40 X |
| 3,600,089 | 8/1971 | Walter | 355/40 X |
| 3,603,675 | 9/1971 | Woodruff | 355/40 X |
| 3,623,808 | 11/1971 | Baasner | 355/40 |
| 3,671,123 | 6/1972 | Murata | 355/112 X |
| 3,674,365 | 7/1972 | Kohler | 355/40 |
| 3,721,495 | 3/1973 | Tanaka | 355/41 |

*Primary Examiner*—Monroe H. Hayes
*Attorney, Agent, or Firm*—Parrott, Bell, Seltzer, Park & Gibson

[57] ABSTRACT

An apparatus for editing an elongated film strip composed of a series of closely spaced photographic negatives such that the film strip is adapted to automatically control various operations in a printing machine as the film strip is passed therethrough. The apparatus includes viewing means for permitting the operator to sequentially view each negative on the film strip, and means for encoding the film strip with a first aperture to indicate the location of those negatives selected to be printed, a second aperture to indicate those selected negatives which are to have a modified exposure setting in the printing machine, and a third aperture to indicate the first negative in a related series of sequential negatives to cause the printing machine to place a sorting mark on the associated positive print.

12 Claims, 14 Drawing Figures

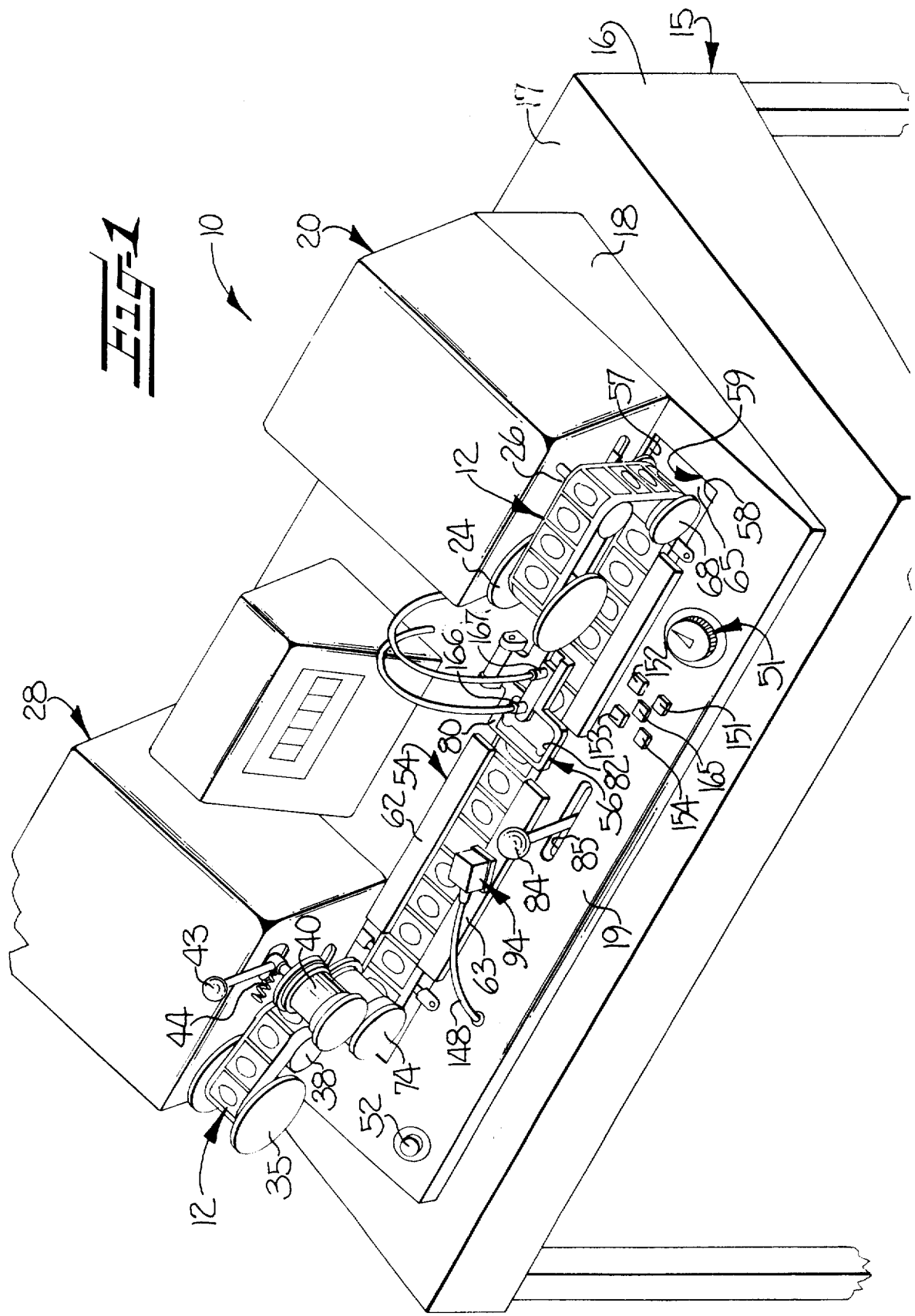

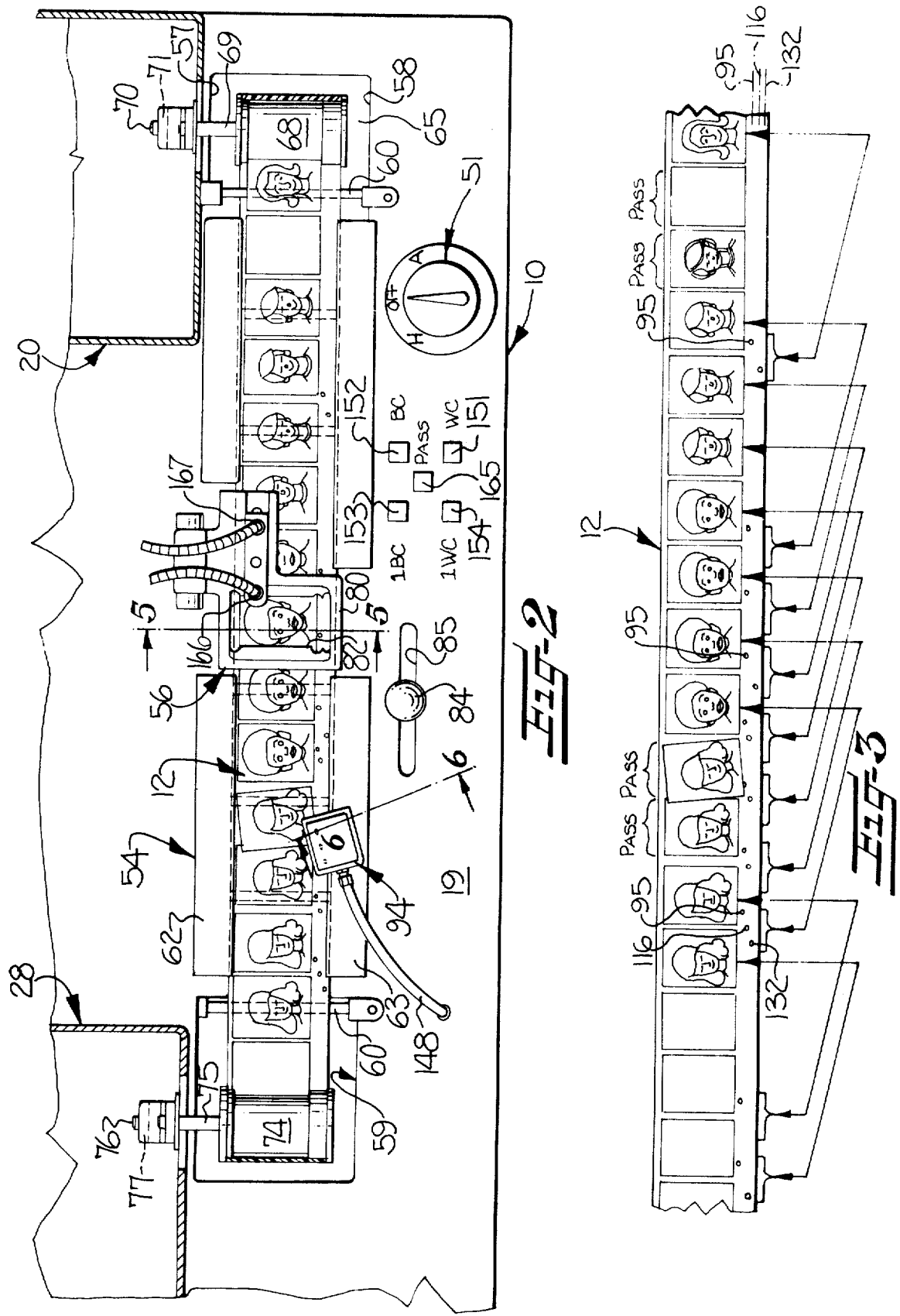

PATENTED AUG 5 1975　3,898,002

SHEET 3

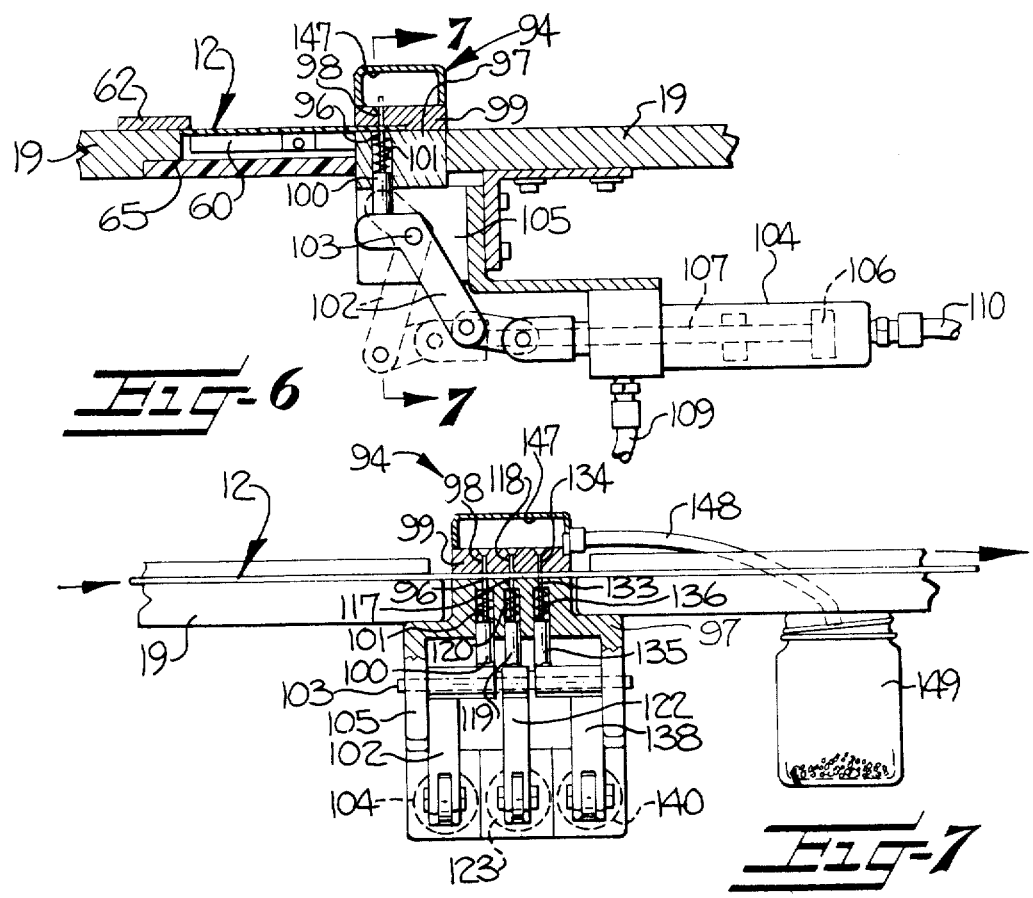
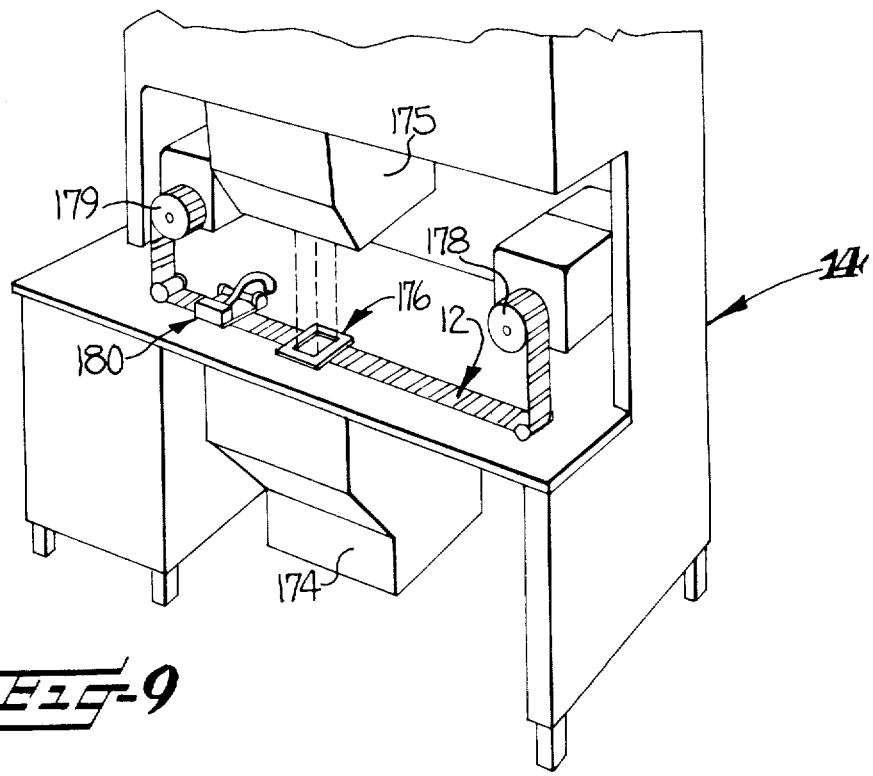

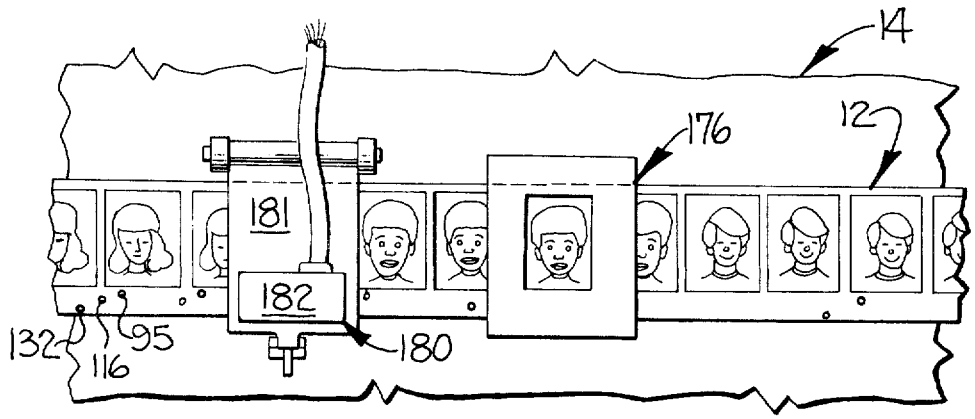
Fig-10
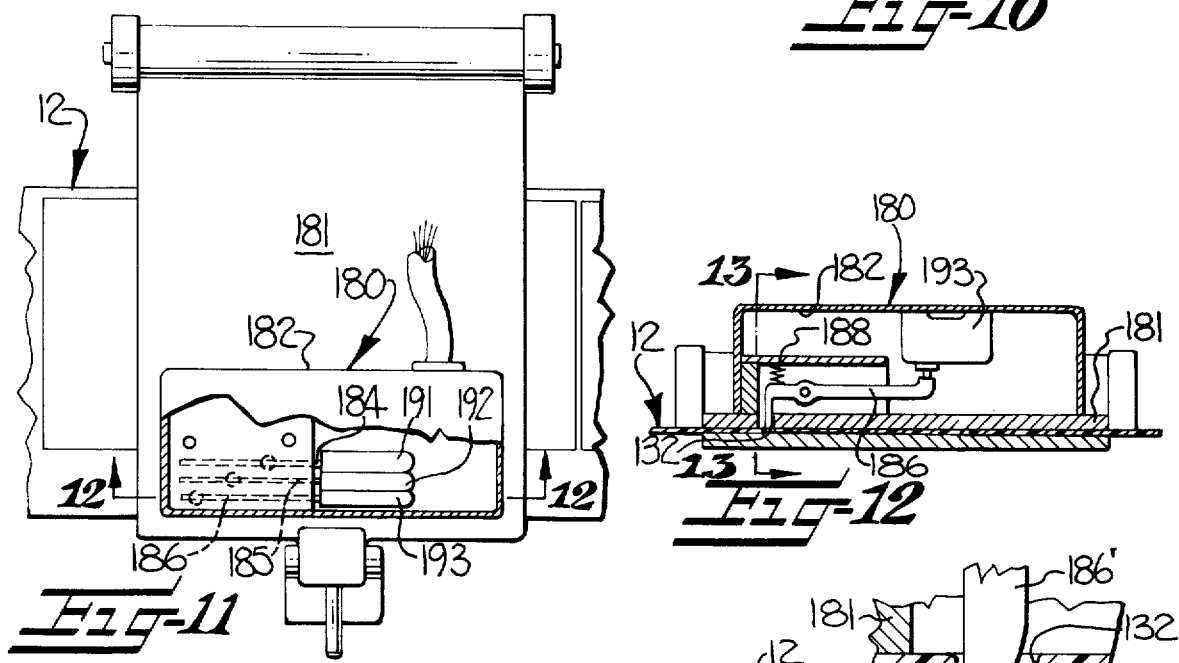
Fig-11
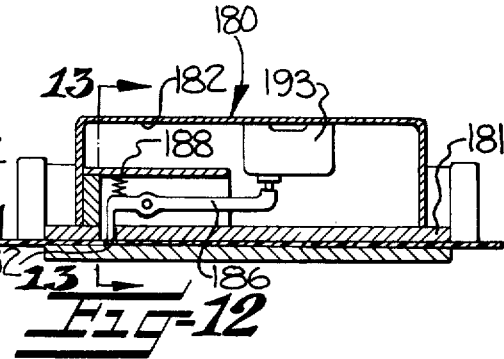
Fig-12
Fig-14
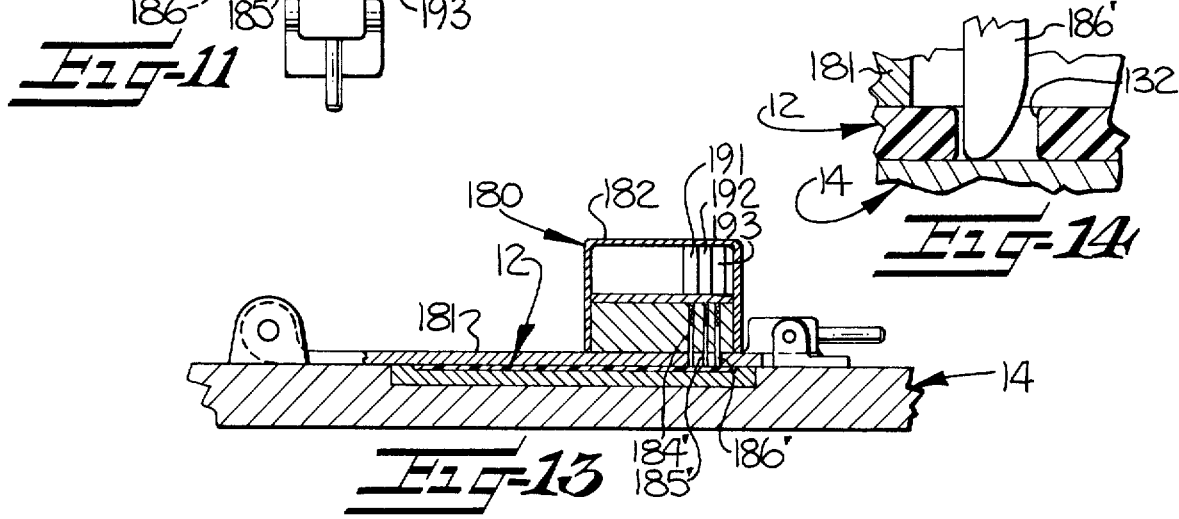
Fig-13

METHOD AND APPARATUS FOR EDITING A FILM STRIP

The present invention relates to a method and apparatus for editing an elongated film strip composed of a series of photographic negatives such that the edited film strip is adapted to control the automatic operation of a printing machine.

In the conventional processing of film strips composed for example of portrait, the strip is sequentially advanced through a printing machine by means of a hand crank which is turned by the operator. The strip passes through a framing device at an exposure station, and by carefully manipulating the hand crank, the operator frames each individual negative and then actuates the printing operation. The strip is then advanced by turning the crank to bring the next sequential negative to the exposure station, and the cycle is repeated. If the operator should notice that the negative at the exposure station requires an exposure setting different from the standard setting, an appropriate exposure or density control is actuated by the operator prior to the printing operation being initiated. Such differing exposure are commonly required, for example, when the negative is a portrait of a person of dark complexion. In addition, certain commercial printing machines include provision for placing a sorting mark in the form of a photographic line on the positive prints to indicate the first negative in a related series of negatives. In such case, the operator would additionally actuate the sorting mark control whenever the first negative of a series of negatives of the same subject is reached, the sorting mark serving to facilitate subsequent cutting and packaging of the prints.

As will be apparent, the above manual operations are time consuming, and the printing machine thus normally runs well below its maximum production capacity. In addition, the manual operations are subject to error since the printing operation is normally conducted in a dark room.

It is accordingly an object of the present invention to provide an apparatus for editing a film strip prior to its being positioned on the printing machine and thus under better viewing conditions, and wherein the edited film is adapted to automatically operate the printing machine at a high production speed.

It is another object of the present invention to provide a film editing apparatus which includes means for placing indicia on the film strip to designate which negatives are to be printed, and to concurrently control the location at which each negative selected to be printed is positioned during the printing operation.

It is a further object of the present invention to provide a film editing apparatus wherein indicia may be positioned on the film strip to designate a change from the predetermined standard exposure setting of the printing machine and also which is adapted to trigger the printing machine to place a sorting mark on the positive prints to facilitate subsequent sorting thereof.

It is also an object of the present invention to provide a film editing apparatus which includes a manually operable control rod for laterally translating the film strip in relation to a fixed framing plate so that the operator may easily and accurately align each negative selected to be printed with the framing plate by manipulating the control rod.

It is still another object of the present invention to provide an apparatus of the described type which includes a number of manually operable switches for placing the appropriate indicia in the film strip, and wherein only one switch need be operated to place any combination of the available indicia in the film strip.

It is still another object of the present invention to provide a film editing apparatus which includes a film strip advancing for sequentially advancing each negative to a framing plate and wherein the advancing system is actuated concurrently upon the operator of the apparatus placing the desired indicia in the film strip, and which further includes a film strip arresting system for stopping the film strip when the next sequential negative generally is in alignment with the framing plate.

These and other objects and advantages of the present invention are achieved in the embodiment illustrated herein by the provision of a film editing apparatus which comprises delivery spool means for mounting a roll of the film strip, take-up spool means for winding the film strip into a roll and such that the film strip may be withdrawn from the delivery pull means, and guide means positioned between the delivery spool means and take-up spool means for guiding the film strip along a horizontal path of travel. A framing plate having an opening corresponding to the configuration of the negative to be printed is mounted immediately above the guide means, and a manually operable control lever is provided for translating the film strip for a limited distance in either direction along the horizontal path of travel to permit the operator of the apparatus to accurately align each negative with the framing plate. Means are also provided for placing a first aperture in the film strip at a predetermined location with respect to the framing plate to designate each negative selected to be printed as well as the location thereof, for placing a second aperture in the film strip when the negative in question is selected by the operator to have a modified exposure setting in the printing machine, and for placing a third aperture in the film strip when the negative is the first in a related series of sequential negatives and it is desired to have a sorting mark placed on the positive print of the negative.

The apparatus further comprises means for advancing the film strip either concurrently with the actuation of the aperture placing means or independently thereof, and means for automatically arresting the advance of the film strip upon the next sequential negative being positioned generally in alignment with the framing plate.

Some of the objects of the invention having been stated, other objects will appear as the description proceeds, when taken in connection with the accompanying drawings, in which —

FIG. 1 is a perspective view of a film editing apparatus embodying the features of the present invention;

FIG. 2 is a fragmentary plan view, partly sectioned, of the apparatus shown in FIG. 1;

FIG. 3 is a plan view of a section of film strip and illustrating the various indicia which are adapted to be positioned thereon by the apparatus of the present invention;

3

Figure 5:
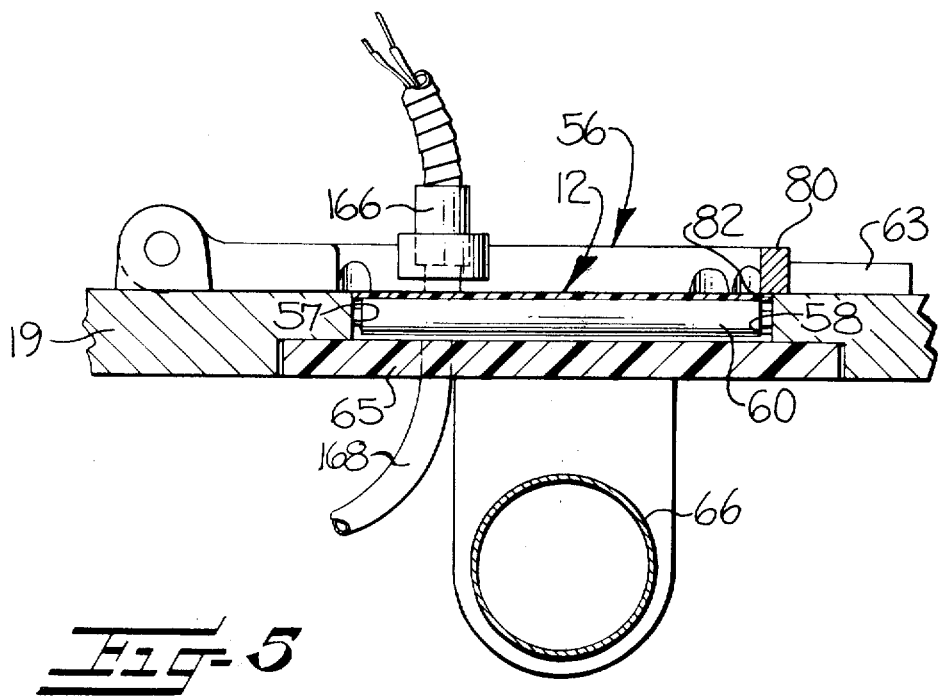
Figure 8:
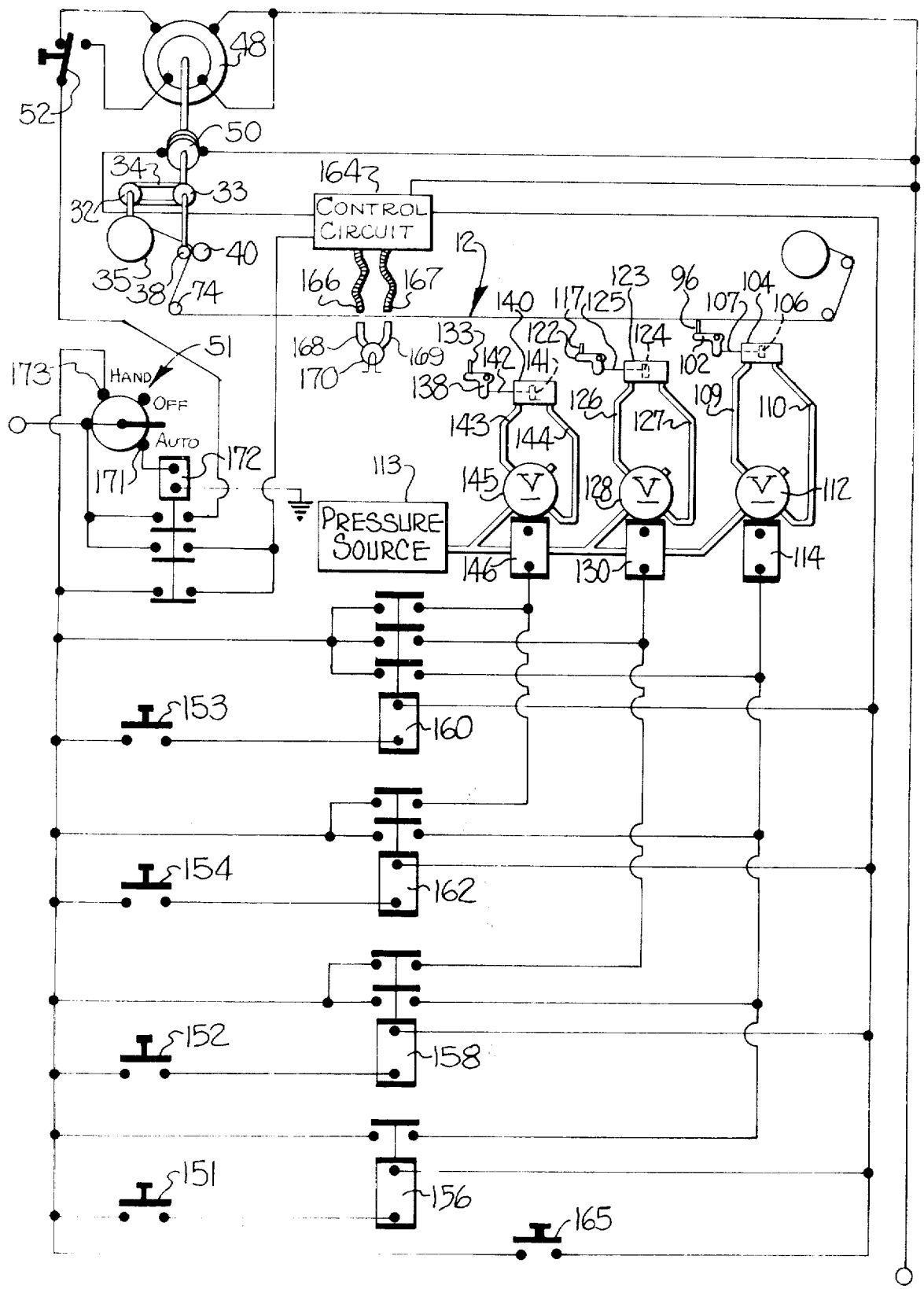

FIG. 5 is an enlarged sectional view taken substantially along the line 5—5 of FIG. 2;

FIG. 6 is an enlarged sectional view taken substantially along the line 6—6 of FIG. 2;

FIG. 7 is a sectional view taken substantially along the line 7—7 of FIG. 6;

FIG. 8 is a schematic representation of the electrical control system employed in the film editing apparatus of the present invention;

FIG. 9 is a somewhat schematic perspective view of a printing machine for use with the present invention;

FIG. 10 is a fragmentary plan view of the exposure station and pick-up housing of the printing machine shown in FIG. 9;

FIG. 11 is an enlarged plan view, partly sectioned, of the pick-up housing of the printing machine;

FIG. 12 is a section view of the pick-up housing taken substantially along the line 12—12 of FIG. 11;

FIG. 13 is a sectioned elevation view of the pick-up housing; and

FIG. 14 is an enlarged fragmentary view of the forward end of one of the pick-up arms in the pick-up housing.

Referring more specifically to the drawings, an apparatus embodying the features of the present invention is illustrated generally at 10 in FIG. 1. As will become apparent, the apparatus 10 is designed to edit an elongated film strip 12 which is composed of a series of closely spaced photographic negative, such that the film strip 12 is adapted to automatically control various operations in a printing machine shown generally at 14 in FIG. 9, as the film strip is passed therethrough. The film strip 12 is generally conventional, and as best seen in FIGS. 2 and 3, it comprises an upper portion having a series of portraits thereon, and a lower border portion.

Figure 4:
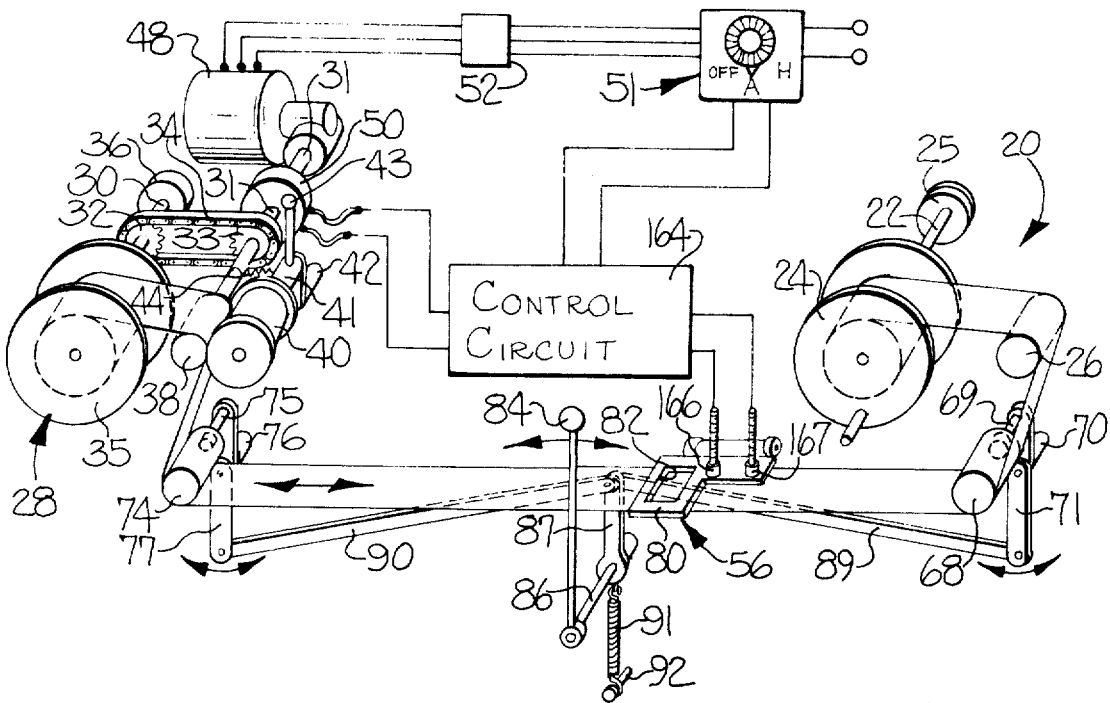
FIG. 4 is a generally schematic illustration, of the delivery and take-up spool means of the present invention, as well as the means for manually translating the film strip to permit the operator to accurately position each negative prior to actuating the aperture placing means.

The apparatus 10 comprises a frame 15 which includes the supporting table 16 defining an upper horizontal surface 17, and a housing 18 carried on the surface 17. The housing 18 includes an inclined upper face plate 19 and in turn mounts delivery spool means generally indicated at 20 for mounting a roll of the film strip 12. More particularly, the delivery spool means 20 includes a horizontally directed central shaft 22 (FIG. 4) mounted for rotation about a fixed axis, and a delivery spool 24 carried at the forward end of the shaft 22. The rear end of the shaft 22 mounts a conventional adjustable spring tensioning member 25 by which the operator may control the resistance of the shaft 22 and the spool 24 to rotation. A guide roll 26 is mounted for rotation adjacent the spool 24 such that the film strip may be withdrawn from the spool and directed downwardly about the guide roller 26.

Take-up spool means indicated generally at 28 is carried at the left-hand end of the housing 18 as seen in FIG. 1 so as to be horizontally spaced from the delivery spool means 20. The take-up spool means 28 is adapted to wind the film strip 12 into a roll such that the film strip may be withdrawn from the delivery spool means 20 and received at the take-up spool means 28. More particularly, the take-up spool and means 28 comprises first and second parallel shafts 30 and 31 respectively, which are rotatably mounted on the housing 18, the shafts 30 and 31 in turn mounting a pair of sprockets 32, 33 and an interconnecting chain 34 such that the two shafts rotate together. The shaft 30 carriers a take-up spool 35 at the forward end thereof for receiving the film strip, and an adjustable spring tensioning member 36 at the rear end thereof to permit the operator to adjust the resistance of the shaft 30 to free rotation.

A first guide roller 38 is mounted at the forward end of the shaft 31 to guide the film strip onto the spool 35, and a second cooperating guide roller 40 is mounted immediately adjacent the roller 38 for rotation about the shaft 41, the shaft 41 in turn being mounted for pivotal movement about the parallel shaft 42. A hand lever 43 extends upwardly from the shaft 41 so as to permit the operator to pivot the second guide roller 40 away from the first guide roller 38 to facilitate threading of the film strip through the apparatus, and a spring 44 interconnects the shaft 41 and shaft 31 to bias the second guide roller 40 into contact with the first guide roller 38 during normal operation of the apparatus.

Rotation of the second shaft 31 is effected by a conventional reversible electric motor 48 acting through the conventional clutch means 50 which comprises a drag or slip clutch with an electric brake. The electric motor 48 is in turn controlled by the master switch 51, and the direction of rotation is controlled by the reverse switch 52.

Guide means generally indicated at 54 is positioned on the housing 18 of the frame between the delivery spool means 20 and the take-up spool means 28, and is adapted to guide the film stripe 12 along a horizontal path of travel therebetween. As will become apparent, this horizontal path of travel defines a viewing station at 56 where the individual negatives of the film strip may be viewed by the operator of the apparatus.

The guide means 54 comprises a horizontally directed channel (not numbered) for closely receiving the film strip, the sides of the channel being defined by the opposing side edges 57 and 58 of the rectangular aperture 59 in the face plate 19, note FIGS. 1 and 5. The lower surface of the channel is defined by a plurality of rollers 60 extending between the sides 57 and 58. In addition, an upper guide strip 62 is carried by the plate 19 and overlies the upper side edge 57 of the aperture 59, the strip 62 comprising two separated segments lying on opposite sides of the viewing station at 56. A lower segmented guide strip 63 is similarly carried by the plate 19 and overlies the lower side edge 58 of the aperture 59. By this arrangement, the film strip 12 may be drawn through the channel with a minimum of frictional resistance and without danger of scratching the negatives on the strip. A translucent plate 65 overlies the aperture 59 below the rollers 60, and a fluorescent light 66 is mounted below the translucent plate 65 to facilitate the viewing of the negative by the operator.

The film strip 12 is guided into the above described channel by a first laterally translatable roller 68 which is mounted adjacent the right end of the aperture 59 as seen in FIG. 1 such that the film strip delivered from the guide roller 26 of the delivery spool means 20 passes at least partially about the roller 68 and directly into the channel. The first roller 68 is rotatably carried by the shaft 69, which in turn is mounted for pivotal movement about a second shaft 70. A lever arm 71 is fixed to the shaft 70 and is adapted to control the lateral movement of the roller 68 by pivoting the same about the axis of the shaft 70 as hereinafter further explained.

A second laterally translatable roller 74 is mounted adjacent the left end of the aperture 59 as seen in FIG.

1 such that the film strip 12 received from the channel passes at least partially around the second roller 74 and upwardly between the guide rollers 38 and 40 and onto the take-up spool 35. The second roller 74 is mounted for rotation about a first shaft 75, which in turn may be pivoted about the second shaft 76 by the lever arm 77.

The apparatus of the present invention further includes means for placing indicia on the film strip at a predetermined location with respect to each of only those negatives selected by the operator to be printed as they are sequentially viewed at the viewing station 56. As will be more specifically described below, the indicia is in the form of a series of apertures which are adapted to selectively operate the printing machine 14 such that the printing machine may automatically print only those negative selected to be printed. In addition, the apertures control the location at which each negative selected to be printed is positioned in the printing machine during the printing operation, and in the illustrated embodiment, the apertures also are adapted to control the exposure setting of the printing machine, and the placement of a sorting mark on the positive prints by the printing machine.

The means for placing the indicia on the film strip 12 includes a framing member 80 carried by the plate 19 of the housing 18 and overlying the viewing station 56 as best seen in FIG. 1. The member 80 is pivotally connected along its upper edge to the plate 19 such that the member may be pivoted upwardly to facilitate the threading of the film strip therebeneath. The member also includes a rectangular opening 82 which corresponds to the configuration of the negative to be printed in the printing machine 14.

The indicia placing means further comprises means for manually translating the film strip 12 for a limited distance in either direction along the channel of the guide means 54 to permit the operator of the apparatus to accurately align each negative with the opening 82 in the framing plate 80. This translating means comprises a manually operable control lever 84 extending upwardly through a slot 85 in the plate 19 and which is pivotally mounted for movement about the axis of the shaft 86. The control lever 84 is operatively interconnected with the lever arms 71 and 77 of the first and second rollers 68 and 74 such that they may be moved concurrently. In particular, this interconnection comprises an upstanding lever arm 87 fixedly carried by the shaft 86, and oppositely directed connecting rods 89 and 90 which are in turn pivotally connected to the lever arms 71 and 77 respectively. A downwardly extending spring 91 is mounted between a fixed pin 92 and the lever arm 97 so as to resiliently bias the control lever 84 and thus the first and second rollers 68 and 74 into a neutral position. By this arrangement, the operator may laterally translate the film strip 12 along the channel of the guide means 54 by moving the control lever 84 in either direction along the slot 85. Since the spring tensioning members 25 and 36 provide a degree of resistance to the free rotation of the spools 24 and 35, the film strip will be translated horizontally along the channel upon movement of the control lever 84, rather than being unrolled from one of the spools 25 and 36.

The indicia placing means further comprises an aperture punching mechanism 94 positioned downstream (or toward the left as illustrated) a predetermined distance from the opening 82. The mechanism 94 includes means for placing a first aperture 95 in the lower border of the strip at a predetermined location with respect to the opening 82 such that the operator may accurately align each negative selected to be printed with the opening by using the control lever 84, and then placed the aperture 95 in the film strip at a predetermined location with respect to the opening 82 and thus also with respect to the particular negative framed in the opening, note FIG. 3. The first aperture placing means includes a first punch 96 (FIG. 6) mounted for vertical reciprocation within the punch housing 97 which is carried by the plate 19, the punch 96 being adapted to cooperate with the first opening 98 in the overlying die 99. The lower end of the punch 96 is enlarged at 100 and the mounting therefore includes a spring 101 for biasing the punch downwardly. The enlarged end 100 is in turn supported on the horizontal arm of the lever 102 which is pivotally mounted about the horizontally directed pin 103 carried by the punch housing 97. A first air cylinder 104 is carried immediately adjacent the punch housing 97 by the bracket 105, and includes a piston 106 and connecting rod 107 which interconnects the piston 106 and the lever 102. First and second air lines 109 and 110 respectively are connected with the air cylinder 104 on opposite sides of the piston 106, and the air lines are connected to a first valve 112 which selectively connects one of the lines 109 and 110 to the pressure source 113, note FIG. 8. In particular, the first valve 112 is designed to admit the pressurized air into one of the lines 109 and 110 while the other line is exhausted to the atmosphere. Thus by controlling the position of the first valve 112, the piston 106 may be selectively advanced and retracted to thereby translate the punch 96 upwardly to form the first aperture in the film strip. The spring 101 then retracts the punch 96 when the piston 106 is retracted by the reversal of the valve 112. In addition, the valve 112 is operatively controlled by the solenoid 114 as hereinafter further explained.

The aperture punching mechanism 94 further includes means for placing a second aperture 116 in the film strip 12 which is adapted to control the exposure setting in the printing machine 14. In particular, it has been found that a different exposure setting in the printing machine may be desirable, for example, when the negative is a portrait of a person of dark complexion. Thus during the editing operation, the second aperture 116 would be placed in the film strip whenever the associated portrait is of such person. The means for placing the second aperture 116 is generally similar to that associated with the first aperture placing means, and includes a second punch 117 mounted for vertical reciprocation in the housing 97, the punch 117 being adapted to cooperate with a second opening 118 in the die 99. The lower end of the punch 117 is enlarged at 119, and a spring 120 is positioned to bias the punch downwardly. The arm of the 122 controls the movement of the punch 117, and the lever 122 is in turn controlled by the second air cylinder 123 which includes the piston 124 and connecting rod 125, and the first and second air lines 126 and 127, respectively, leading to the second valve 128. The valve 128 is in turn operatively controlled by the solenoid 130.

The aperture punching mechanism 94 further includes means for placing a third aperture 132 in the film strip, the third aperture being adapted to control the printing machine to cause a sorting mark to be placed on the positive print representing the first of a related series of pictures. As noted above, it is desirable to place this sorting mark on the first print of series of pictures taken of a particular person. The third aperture placing means is generally similar to the above described first and second aperture placing means, and includes a third punch 133 mounted in housing 97 and positioned to cooperate with the third opening 134 in the die 99. The lower end of the third punch is enlarged at 135 and a spring 136 is carried by the housing 97 for biasing the punch 133 downwardly. The enlarged end 135 is supported on the arm of the lever 138, the lever 138 being interconnected to the third air cylinder 140 which includes the piston 141 and connecting rod 142. In addition, first and second air lines 143 and 144 are operatively connected to the third air cylinder 140 for selectively connecting the same to the pressure source 113 by means of the third valve 145, the third valve 145 being operatively controlled by the solenoid 146.

As best seen in FIGS. 6 and 7, an enclosed chamber 147 is positioned above the die 99 and is designed to receive the portions of the film strip which are removed by the aperture placing means. A tube 148 communicates with the chamber and leads to a removably mounted receptacle 149 positioned beneath the plate 19. It has been found that during operation of the apparatus, the removed portions will automatically be delivered through the tube 148 to the receptacle 149.

The first, second and third aperture placing means as described above are selectively actuated by the operator of the apparatus to key the desired information onto the film strip 12 for controlling the operation of the printing machine 14. Such actuating means includes a total of four switches, numbered 151, 152, and 154, note particularly FIGS. 1 and 8.

The first switch 151 may conveniently be labeled "white child," and actuation thereof by the operator initially actuates the controlling solenoid 156, which in turn actuates the solenoid 114 to place the first aperture 95 in the film strip. As hereinafter further explained, the aperture 95 is adapted to selectively operate the printing machine 14 such that only those negatives having an associated first aperture will be printed by the printing machine. Also, the location of the first aperture 95 with respect to the selected negatives controls the location at which such negative is positioned in the printing machine during the printing operation. Thus by design, when a particular negative is properly framed in the opening 82 of the framing member 80 and the first aperture placing means is actuated, the negative will be identically framed in the printing machine 14 when the negative is printed.

Actuation of the second switch 152 actuates the controlling solenoid 158 to substantially concurrently actuate the solenoids 114 and 130 and thus the first aperture placing means and the second aperture placing means. Thus both a first aperture 95 and a second aperture 116 are caused to be formed in the film strip at a predetermined location with respect to the negative positioned beneath the opening 82 in the framing plate. The first aperture 95 performs the functions noted above in identifying and locating the negative to be printed, while the second aperture 116 is adapted to change the exposure setting of the printing machine 14 from the predetermined setting to a modified setting. Thus the second switch 152 is actuated, for example, when the negative is a portrait of a Negro child, and this switch may conveniently be labeled "black child."

Actuation of the third switch 153 actuates the controlling solenoid 160 to substantially concurrently actuate solenoids 114, 130, and 146, and thus the first aperture placing means, the second aperture placing means, and the third aperture placing means. Thus a total of three aperture are formed in the film strip, with the first aperture 95 and second aperture 116 performing the above described functions, and with the third aperture 132 being adapted to control the printing machine 14 to cause a sorting mark to be placed on the positive print. This sorting mark represents the first of a related series of pictures, and serves to facilitate the subsequent sorting and packing of the prints. Typically, the sorting mark comprises a photographic line appearing near the border of the prints. The third switch 153 would be actuated, for example, when the associated negative represents the first of a series of pictures of the same Negro child, and thus this switch may conveniently be labeled "first black child."

Actuation of the fourth switch 154 actuates the controlling solenoid 162 to substantially concurrently actuate the solenoids 114 and 146, and thus the first aperture placing means and the third aperture placing means. In this case, a first aperture 95 and a third 132 are placed in the film strip, and this switch would be normally actuated, for example, when the negative represents the first of a series of pictures of the same white child. Thus this switch may be conveniently labeled "first white child."

As will be further described below, each of the first through fourth switches 151–154 substantially concurrently actuates an advancing means for the apparatus such that the film strip 12 is advanced immediately after the designated apertures are punched in the film strip. This advancing means includes the reversible electric motor 48, the clutch means 50, and the control circuit schematically illustrated at 164 in FIGS. 4 and 9. The specific design of the control circuit is conventional and well known to those skilled in the art, and it therefore will not be described in further detail herein. When the advancing means is actuated, the clutch means 50 acts to interconnect the shaft 31 with the motor 48 so that the shaft is rotated thereby. In this condition, the spool 35 and roller 38 are thus rotated by the motor 48.

An independently operable advancing switch 165 is provided for actuating the advancing means, and thus actuation of any of the first through fourth switches 151–154 or the advancing switch 165 will actuate the advancing means. In this regard, it will be noted that a conventional delay circuit may be incorporated in the circuit 164 to insure that there is an adequate time for the selected punches to be advanced and withdrawn from the film strip prior to commencement of the advance of the film strip.

Means are also provided for automatically arresting the advance of the film strip upon the next sequential negative being positioned generally in alignment with the opening 82 in the framing member. As illustrated, this arresting means includes means for sensing the unexposed lines between the sequential negative of the film strips. More particularly, the sensing means includes two laterally spaced apart fiber optic light sensors 166 and 167 carried by the framing plate 80 adjacent the opening thereof, and two cooperating fiber optic lights 168 and 169 which are illuminated by the bulb 170 (FIG. 8). Thus the sensors 166 and 167 monitor the light passing upwardly through the film strip from the lights 168 and 169, and the sensors are able to locate the unexposed lines between the sequential negatives. When such unexposed line is located, they act via the control circuit 164 to actuate the clutch means 50 to disconnect the shaft 31 from the motor 48 and hold the shaft stationary. Thus the rotation of the take-up spool 35 stops and the advance of the film strip is terminated. The two light sensors 166 and 167 are laterally spaced apart a distance substantially equal to the width of the negative in the film strip so that in the event the two adjacent negative overlap (note FIG. 3), the second sensor will be able to terminate the advance of the film strip. Thus by design, a signal received from either of said sensors 166 and 167 causes the control circuit 164 to terminate the advance of the film strip. In this regard, a suitable delay may be built into the circuit 164 so that the sensors will not become activated until a sufficient time has elapsed after the actuation of the advancing means to permit the next negative to substantially reach the desired position beneath the opening 82 so that false readings from possible light areas in the negatives may be eliminated. Also, since the sensors are mounted on the framing plate 80, the advance may be made continuous by merely pivoting the plate rearwardly.

As noted above, the operations of the film editing apparatus is controlled by the master switch 51. As best seen in FIG. 8, the master switch 51 has a "automatic" terminal 171 for actuating the solenoid 172 to operate both the indicia placing means and the advancing means, and a "hand" terminal 173 for operating only the indicia placing means. This latter terminal may be employed, for example, when a film strip is edited which does not have adequate spaces between the negatives to operate the sensors 166 and 167.

The printing machine 14 as shown in FIG. 9 represents a modification of a conventional, commerical machine manufactured by the Eastman Kodak Company. As noted above, the printer as presently manufactured includes suitable spools for mounting a roll of the film strip, and a hand crank by which the operator feeds the film strip past an exposure station. Thus the individual negatives are initially framed at the exposure station by the operator, and the operator then manually actuates the printing operation. In addition, the conventional printing machine includes a manually operable exposure control system by which the operator may adjust the exposure of the machine, and such machine may further include a manually operable control for applying a sorting mark to the prints. Typically, the sorting mark application is effected by means of a small light bulb, which when lighted, directs a beam of light through a slot and onto the print to form a dark line along the border thereof.

In accordance with the present invention, the control of these basic operations of the conventional printing machine has been automated so that the machine is able to operate at a greatly increased speed and efficiency. More particularly, the above conventional printing machine has been modified such that the film strip which has been edited on the above described editing apparatus 10 may be automatically fed through the printing machine, and with the apertures in the edited film strip serving to select only those negatives which are to be printed, to frame the selected negatives at the exposure station, and also to operate the intensity and sorting mark controls.

In describing the printing machine 14 herein, it will be understood that only the modifications to the machine will be described in detail, it being understood that the structure of the remaining portions of the machine are conventional and well known to those skilled in the art. Viewing FIG. 9 it will be seen that the machine includes a light housing 174, an optical section 175, and an exposure station 176. While not illustrated, a roll of print paper is mounted in the machine above the optical section 175. The edited film strip 12 is mounted on the machine by the delivery spool means 178 and the take-up spool means 179. The delivery spool means and the take-up spool means are generally similar in structure and operation to the above described corresponding means 20 and 28 of the film editing apparatus 10.

An aperture monitoring device 180 is mounted on the left side of the exposure station 176 a distance corresponding to that by which the aperture punching mechanism 94 is offset from the opening 82 of the framing member 80 on the film editing apparatus. The device 180 includes a flat plate 181 which is pivotally mounted to the printing machine so that it may be lifted to facilitate the threading of the film strip 12 therebeneath, and the plate 181 in turn mounts a housing 182 for three pivotal pick-up arms 184, 185, and 186. These pick-up arms include forward vertically directed ends 184', 185', and 186' which are adapted to enter the aperture 95, 116 and 132, respectively, as the film strip is passed therebeneath. In this regard, it will be noted that the forward ends 184', 185' and 186' are transversely aligned, and that a spring 188 is associated with each of the arms to bias the same downwardly into the associated apertures.

Three switches 191, 192 and 193 are also mounted within the housing and are adapted to be actuated by the arms 184, 185, and 186, respectively, when the associated forward end enters an aperture. When the switch 191 is actuated by the arm 184 entering a first aperture 95, the advance of the film strip is terminated. In the event that the switch 192 is actuated by the presence of a second aperture 116 in the film strip, the intensity control of the printing machine will be adjusted to provide a modified exposure setting. Similarly, in the event the third switch 193 is actuated, a sorting mark will be printed on the associated positive print of the negative.

Since the vertically directed ends of the arms are aligned transversely across the film strip, while the apertures 95, 116 and 132 are inclined thereto, the switches will be actuated in sequence. Thus for example, in the case of a negative having all three apertures, the sorting mark control and the density control will be actuated while the film strip continues its advance to thereby provide time for the proper adjustments to be made in the printing machine prior to the initiation of the printing operation. Also, a suitable delay circuit may be incorporated to further delay the initiation of the printing operation after the termination of the advance, if necessary.

Upon initiation of the prining operation, there is another delay to give time for the completion of the printing operation, after which the film is advanced until another first aperture 95 is brought beneath the aperture monitoring device 180, and the above cycle is repeated. Thus only those negatives on the film strip 12 will be printed at the printing machine which have been selected to be printed by the operator of the film editing apparatus, and the selected negatives will also be automatically framed at the exposure station 176 by reason of the predetermined positioning of the first aperture 95 in relation to the associated negative.

In the drawings and specification, there has been set forth a preferred embodiment of the invention, and although specific terms are employed, they are used in a generic and descriptive sense only and not for purposes of limitation.

That which is claimed is:

1. An apparatus for editing an elongated film strip composed of a series of closely spaced photographic negatives such that the film strip is adapted to automatically control various operations in a printing machine as the film strip is passed therethrough, said apparatus comprising a frame, delivery spool means carried on said frame for mounting a roll of the film strip, take-up spool means carried on said frame and spaced from said delivery spool means for winding the film strip into a roll such that the film strip may be withdrawn from said delivery spool means and received on said take-up spool means, guide means positioned on said frame between said delivery spool means and said take-up spool means for guiding the film strip therebetween and defining a viewing station to permit the negatives of the film strip to be sequentially viewed by the operator of the apparatus, said guide means including a channel extending horizontally along said frame ans defining a first end adjacent said delivery spool means and a second end adjacent said take-up spool means, a first laterally translatable roller mounted adjacent said first end of said channel such that the film strip delivered from said delivery spool means passes at least partially about said first roller and into said channel, and a second laterally translatable roller mounted adjacent said second end of said channel such that the film strip received from said channel passes at least partially about said second roller and onto said take-up spool means, and means carried by said frame for placing an indicium on the film strip at a predetermined location with respect to each of only those negatives selected by the operator to be printed as they are sequentially viewed at said viewing station such that the indicia are adapted to selectively operate the printing machine to print only those negatives selected to be printed and to control the location at which each negative selected to be printed is positioned in the printing machine during the printing operation, said indicium placing means comprising a framing plate carried by said frame ans overlying said guide means at said viewing station, said plate including an opening corresponding to the configuration of the negative to be printed in the printing machine, and means for manually translating the film strip for a limited distance in either direction along said guide means to permit the operator of the apparatus to accurately align each negative with said opening in said framing plate, said means for manually translating the film strip including a manually operable control lever mounted to said frame for limited lateral movement, and means for operatively interconnecting said first and second rollers with said control lever such that they move concurrently, whereby the operator may laterally translate the film strip along said guide means by moving said control lever.

2. The apparatus as defined in claim 1 wherein said means for interconnecting said first and second rollers with said control lever includes means for resiliently biasing said first and second rollers and said control lever into a neutral position to thereby permit limited lateral movement in either direction.

3. The apparatus as defined in cliaim 2 wherein said delivery spool means and said take-up spool means each include adjustable tensioning means for resisting the free rotation of a roll of the film strip mounted thereon to thereby facilitate the operation of said means for manually translating the film strip.

4. The appartus as defined in claim 1 wherein said indicium placing means further comprises indicium applying means mounted on said frame a fixed distance from said opening and adjacent said guide means, and wherein said apparatus further comprises manually operable indicium switch, means for actuating said indicium applying means.

5. The apparatus as defined in claim 4 wherein said apparatus further comprises means for advancing the film strip from said delivery spool means onto said take-up spool means and along said guide means, and manually operable advancing switch means for actuating said advancing means.

6. The apparatus as defined in claim 5 wherein said indicium switch means further includes means for actuating said advancing means, whereby operation of said indicium switch means by the operator results in actuation of both said indicium applying means and said advancing means.

7. The apparatus as defined in claim 6 wherein said indicium switch means further includes timing means for delaying the actuation of said advancing means to thereby ensure that the operation of said indicium applying means is completed before the commencement of the advance of the film strip.

8. The apparatus as defined in claim 5 wherein said apparatus further comprises means for automatically arresting the advance of the film strip upon the next sequential negative being positioned substantially in alignment with said opening in said framing plate.

9. The apparatus as defined in claim 8 wherein said take-up spool means includes a take-up spool, an electric motor, and clutch means for selectively interconnecting said electric motor and spool to rotate the spool and disengaging said electric motor and spool while holding the spool against rotation, and said means for advancing the film strip includes means for selectively actuating said clutch means to cause the spool to rotate, and said means for arresting the advance of the film strip includes means for selectively actuating said clutch means such that the spool is held against rotation.

10. The apparatus as defined in claim 9 wherein said means for arresting the advance of the film strip further includes means for sensing the unexposed line between the sequential negatives.

11. The apparatus as defined in claim 8 wherein said indicium applying means includes a punch mounted for reciprocative movement on said frame adjacent said guide means, and piston means for sequentially reciprocating said punch forwardly to extend through said film strip and rearwardly to withdraw the same from the film strip such that an aperture is positioned in the film strip.

12. An apparatus for editing an elongated film strip composed of a series of closely spaced photographic negatives such that the film strip is adapted to automatically control various operations in a printing machine as the film strip is passed therethrough, said apparatus comprising a frame, delivery spool means carried on said frame for mounting a roll of the film strip, take-up spool means carried on said frame and spaced from said delivery spool means for winding the film strip into a roll such that the film strip may be withdrawn from said delivery spool means and received on said take-up spool means, said take-up spool means including a take-up spool, an electric motor, and clutch means for selectively interconnecting said electric motor and spool to rotate the spool and disengating said electric motor and spool while holding the spool against rotation, guide means positioned on said frame between said delivery spool means and said take-up spool means for guiding the film strip therebetween and defining a viewing station to permit the negatives of the film strip to be sequentially viewed by the operator of the apparatus, means carried by said frame for placing an indicium on the film strip at a predetermined location with respect to each of only those negatives selected by the operator to be printed as they are sequentially viewed at said viewing station such that the indicia are adapted to selectively operate the printing machine to print only those negatives selected to be printed and to control the location at which each negative selected to be printed is positioned in the printing machine during the printing operation, said indicium placing means comprising a framing plate fixedly carried by said frame, said plate including an opening overlying said guide means at said viewing station and corresponding to the configuration of the negative to be printed in the printing machine, indicium applying means mounted on said frame a fixed distance from said opening and adjacent said guide means, and means for manually translating the film strip for a limited distance in either direction with respect to said opening and applying means to permit the operator of the apparatus to accurately align each negative with said opening, manually operable indicium switch means for actuating said indicium applying means, manually operable advancing switch means for selectively actuating said clutch means to cause said spool to rotate and thereby advance the film strip from said delivery spool means onto said take-up spool means, and means for automatically arresting the advance of the film strip upon the next sequential negative being postioned substantially in alignment with said opening in said framing plate and including means for selectively actuating said clutch means such that the spool is held against rotation, and means for sensing the unexposed line between the sequential negatives, said sensing means including a. a light source positioned adjacent said guide means such that the light therefrom passes through the film strip, b. two laterally spaced apart fiber optic light sensors positioned adjacent said guide means so as to monitor the light passing through the film strip from said light source, said light sensors being laterally spaced apart a distance substantially equal to the width of the negatives in the film strip, and c. means operatively controlled by said light sensors for actuating said film strip arresting means when either of said light sensors sense an unexposed line between the sequential negatives, whereby the arresting means will be actuated upon the next sequential negative being positioned substantially in alignment with said opening in said framing plate even when two sequential negatives overlap and thus have no unexposed line therebetween.

* * * * *

UNITED STATES PATENT OFFICE
CERTIFICATE OF CORRECTION

PATENT NO. : 3,898,002

DATED : August 5, 1975

INVENTOR(S) : Claude E. Kinder et al

It is certified that error appears in the above-identified patent and that said Letters Patent are hereby corrected as shown below:

```
Column 1, Line 9, after "portrait" insert --negatives--;
Column 2, Line 7, after "advancing" insert --system--;
Column 3, Line 29, "negative" should be --negatives--;
Column 4, Line 23, "verse" should be --versing--;
Column 4, Line 27, "stripe" should be --strip--;
Column 5, Line 16, "negative " should be --negatives--
Column 5, Line 52, "97" should be --87--;
Column 6, Line 6, "placed" should be --place--;
Column 6, Line 57, after "the" insert --lever--;
Column 7, Line 34, after "152" insert --153--;
Column 8, Line 7, "aperture" should be --apertures--;
Column 8, Line 14, "packing" should be --packaging--;
Column 8, Line 25, after "third" insert --aperture--;
Column 8, Line 63, "negative" should be --negatives--;
Column 9, Line 13, "negative" should be --negatives--;
Column 10, Line 31, "aperture" should be --apertures--;
Column 10, Line 64, "prining" should be --printing--;
Column 11, Line 34, "ans" should be --and--;
Column 11, Line 57, "ans" should be --and--;
Column 13, Line 23, "disengating" should be --disengaging--.
```

Signed and Sealed this second Day of December 1975

[SEAL]

Attest:

RUTH C. MASON
Attesting Officer

C. MARSHALL DANN
Commissioner of Patents and Trademarks